United States Patent
Rees

(10) Patent No.: US 8,806,222 B2
(45) Date of Patent: Aug. 12, 2014

(54) METHOD AND SYSTEM FOR CONTAINED CRYPTOGRAPHIC SEPARATION

(75) Inventor: Robert Thomas Owen Rees, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1270 days.

(21) Appl. No.: 11/335,824

(22) Filed: Jan. 20, 2006

(65) Prior Publication Data

US 2007/0198853 A1 Aug. 23, 2007

(30) Foreign Application Priority Data

Jan. 21, 2005 (GB) .................................. 0501248.9

(51) Int. Cl.
*G06F 21/00* (2013.01)
(52) U.S. Cl.
USPC .......................................... 713/189; 713/182
(58) Field of Classification Search
CPC ................................. G06F 21/72; G06F 21/31
USPC ........... 380/228, 229, 232, 239, 243, 259, 37, 380/42; 713/153, 164, 189; 726/22–25; 707/9
See application file for complete search history.

(56) References Cited

U.S. PATENT DOCUMENTS

| | | | |
|---|---|---|---|
| 6,754,819 B1* | 6/2004 | Wootten et al. | 713/150 |
| 8,307,206 B2* | 11/2012 | Ahuja et al. | 713/168 |
| 2003/0009685 A1 | 1/2003 | Choo et al. | |
| 2003/0084436 A1* | 5/2003 | Berger et al. | 717/174 |
| 2003/0149895 A1 | 8/2003 | Choo et al. | |
| 2004/0088536 A1* | 5/2004 | Lim et al. | 713/151 |
| 2004/0228479 A1* | 11/2004 | Crispin et al. | 380/28 |
| 2004/0260921 A1* | 12/2004 | Treadwell | 713/150 |
| 2007/0033283 A1* | 2/2007 | Brown | 709/226 |
| 2008/0140578 A1* | 6/2008 | Felt et al. | 705/71 |
| 2009/0196417 A1* | 8/2009 | Beaver et al. | 380/45 |
| 2010/0299759 A1* | 11/2010 | Kim et al. | 726/28 |

OTHER PUBLICATIONS

R. Scheier; "Trusted Operating Systems: Ultimate Defense"— Computerworld; www.computerworld.com/securitytopics/security/story/0,10801,53293,00.html; Nov. 6, 2000.
"Trusted Solaris Data Sheet"— Sun Microsystems; http://wwws.sun.com/software/solaris/trustedsolaris/ds-ts8/index.html.
"Trusted Solaris™ 8 Operating Environment Data Sheet"—Sun Microsystems; http://wwws.sun.com/software/solaris/trustedsolaris/ds-ts8/ds-ts8.pdf.
"Stunnel—Universal SSL Wrapper"; Stunnel.Org; http://www.stunnel.org/.

(Continued)

*Primary Examiner* — Mohammad L Rahman

(57) ABSTRACT

To provide for cryptographic separation, embodiments of the invention employ containment mechanisms provided by trusted operating systems to ensure that plaintext data which must be encrypted in accordance with a security policy (or, in reverse, ciphertext data which is to be decrypted) is processed by a suitable encryption routine before being sent onwards for transmission, storage, or the like. Such containment mechanisms usually include mandatory system access control rules which specify to which system resources the output of a system resource (such as an application) may be supplied. By specifying a suitable set of such rules, mandatory encryption can be enforced at the operating system kernel level.

17 Claims, 7 Drawing Sheets

(56) References Cited

OTHER PUBLICATIONS

T. Rhodes; "Chapter 15: Mandatory Access Control"; FreeBSD Handbook; http://www.freebsd.org/doc/en_US.ISO8859-1/books/handbook/mac.html.

C. Dalton et al; "An Operating System Approach to Securing e-services"; Communications of the Association of Computing Machinery, Inc. (ACM); vol. 44, Issue 2 (2001), p. 58. (ISSN: 0001-0782) http://www.hpl.hp.com/research/papers/Dalton.ACM.pdf.

C. Dalton et al; "Applying Military Grade Security to the Internet"; Proceedings JENC8;711-1 (session VII-1, $1^{st}$ paper); http://www.hpl.hp.com/techreports/97/HPL-97-98.pdf.

"Appache HTTP Server Version 2.0: SSL/TLS Strong Encrytion: An Introduction"; Apache; http://httpd.apache.org/docs-2.0/ssl/ssl_intro.html.

* cited by examiner

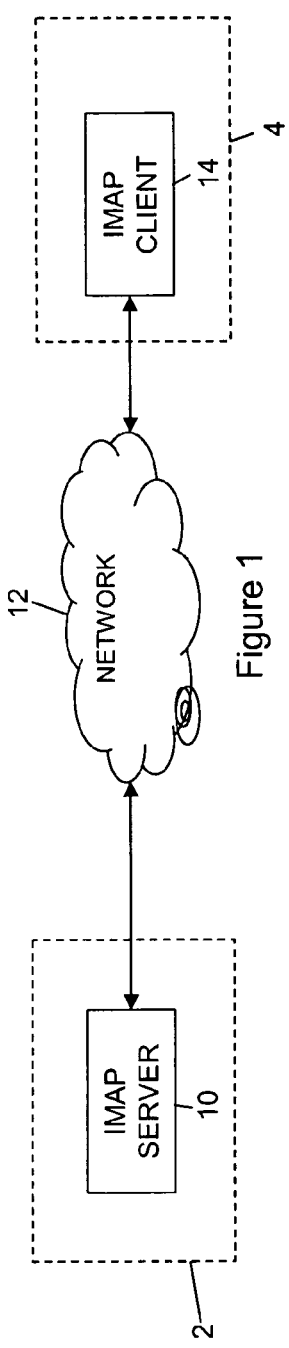
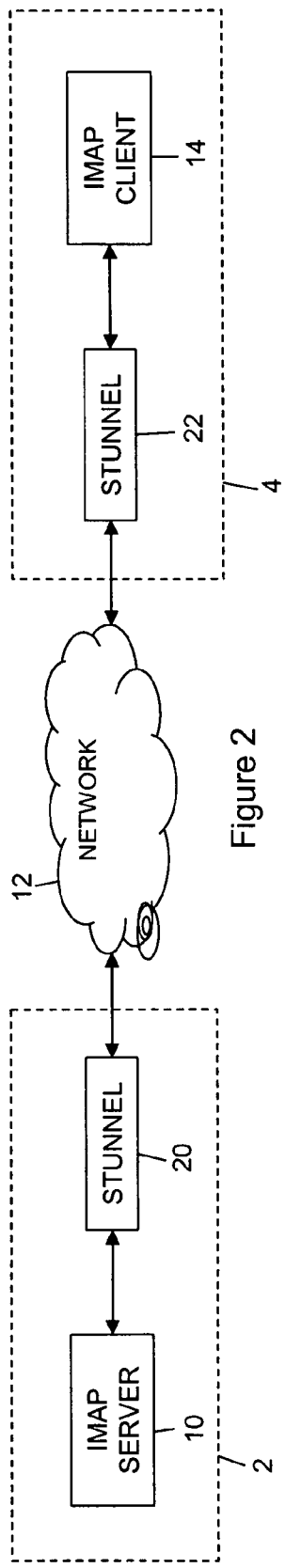
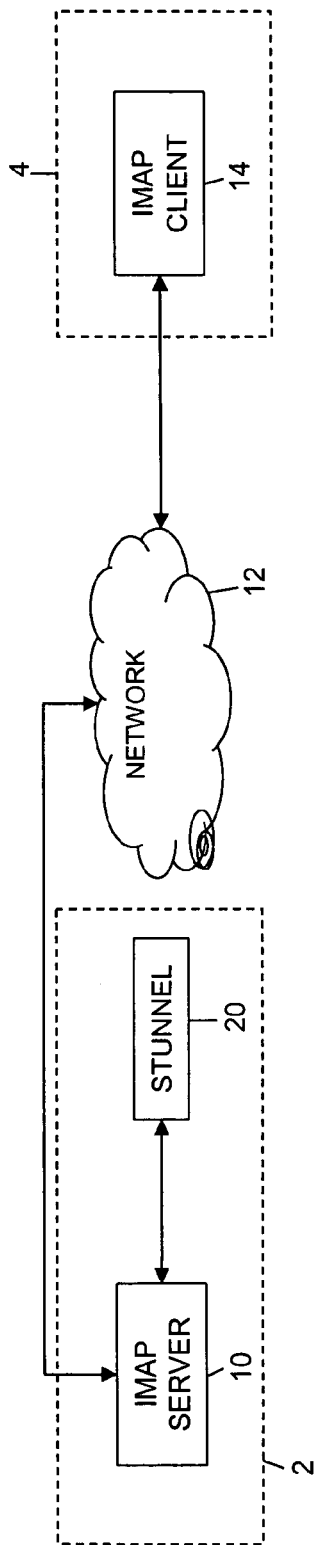

METHOD AND SYSTEM FOR CONTAINED CRYPTOGRAPHIC SEPARATION

BACKGROUND OF THE INVENTION

The present invention relates to a method and system for ensuring cryptographic separation between plaintext and ciphertext is maintained, using operating system kernel level containment mechanisms.

Where encryption of data is a security policy requirement within a system there is a need to ensure that unencrypted data (referred to herein as "plaintext") is kept separate from encrypted data (referred to herein as "ciphertext"). Such separation is referred to as "red/black separation" (where "red" refers to plaintext, and "black" to ciphertext), and is necessary to ensure that sensitive plaintext information does not become available either in an application, storage device, network, or other system component in which it might be compromised. For example, where there is a security policy requirement that plaintext data is encrypted prior to transmission, storage, or the like, it is necessary to ensure that such encryption is actually performed on the plaintext data prior to the action being performed.

SUMMARY OF THE INVENTION

Embodiments of the invention employ containment mechanisms provided by trusted operating systems to ensure that plaintext data which must be encrypted in accordance with a security policy (or, in reverse, ciphertext data which is to be decrypted) is processed by a suitable encryption routine before being sent onwards for transmission, storage, or the like. Such containment mechanisms usually include mandatory system access control rules that specify to which system resources the output of a system resource (such as an application) may be supplied. By specifying a suitable set of such rules, then mandatory encryption can be enforced at the operating system kernel level.

In view of the above, from a first aspect the invention provides a system for data encryption comprising an encryption engine; a plaintext data system resource; and a ciphertext data system resource; operating system elements being further provided to ensure that data passing between said plaintext data system resource and said ciphertext data system resource is processed by the encryption engine so as to be encrypted or decrypted, as appropriate. With such operating system elements cryptographic separation can be enforced by the operating system.

In preferred embodiments of the invention the operating system elements comprise control elements arranged to provide mandatory system resource access controls. Preferably the operating system elements comprise operating system compartments, and communications rules specifying permissible communications between said compartments. With such arrangements trusted operating systems such as HP® Trusted Linux may be used.

Preferably, the encryption engine further comprises a plaintext encryption control element, an encryption element, and a ciphertext encryption control element, which are further preferably contained separately, for example within their own operating system compartments. Such an arrangement breaks down the operation of the encryption component into smaller operations, thus providing a greater degree of assurance of the correctness of each component operation.

Additionally, preferably the encryption engine further includes a key server, which is preferably contained within its own operating system compartment. Such provision provides a further degree of security to the arrangement.

From a second aspect there is provided a method for use with data encryption, comprising the steps of defining, using operating system elements, a mandatory data path from a plaintext system resource to a ciphertext system resource via an encryption engine; routing data between said plaintext system resource and said ciphertext system resource via said data path; and processing said data on said data path with said encryption engine so as to encrypt or decrypt said data.

Within the second aspect, the same advantages and further features and advantages may be obtained as in the first aspect, mutatis mutandis.

Additionally, a third aspect of the invention provides a method of operating a computer system provided with a trusted operating system, comprising applying mandatory access control rules to ensure that unencrypted data is maintained separate from encrypted data.

Moreover, a fourth aspect of the invention provides a method of operating a computer system provided with a trusted operating system which provides for compartmented containment of system resources, comprising maintaining an encryption engine within a first compartment; maintaining at least one application within at least one further respective compartment; storing operating system communications rules specifying that data to be output from the at least one application must be input to the From a fifth aspect, there is also provided a computer program or suite of computer programs arranged such that when executed by a computer system it/they cause the computer system to operate in accordance with any of the second, third or fourth aspects.

From a sixth aspect, there is further provided a computer usable storage medium storing a computer program or one of the suite of computer programs according to the fifth aspect. Preferably, the computer usable storage medium may be any magnetic, optical, magneto-optical, solid-state, or other storage medium known in the art, for example a hard disk, a portable disk, a CD Rom, a DVD, RAM, ROM, programmable ROM, tape, or the like. It should be noted that the list of computer readable storage media given above is not exhaustive, and any known computer usable storage media may suffice.

In another aspect, the present invention also provides a computer system provided with a trusted operating system, the trusted operating system being arranged in use to apply mandatory access control rules to ensure that unencrypted data is maintained separate from encrypted data.

Finally, a computer system provided with a trusted operating system which provides for compartmented containment of system resources, and further comprising operating system elements arranged in use to:—maintain an encryption means within a first compartment; maintain at least one application within at least one further respective compartment; store operating system communications rules specifying that data to be output from the at least one application must be input to the compartment containing the encryption means; and transfer data between said compartments in accordance with said operating system communications rules is also provided by a yet further aspect.

BRIEF DESCRIPTION OF DRAWINGS

Embodiments of the invention will now be described, presented by way of example only, with reference to the accompanying drawings, wherein like reference numerals refer to like parts, and wherein: —

FIG. 1 is a block diagram illustrating an IMAP client/server arrangement of the prior art;

FIG. 2 is a block diagram illustrating how encryption may be added to an IMAP client/server arrangement of the prior art;

FIG. 3 is a block diagram illustrating how encryption may be avoided in an IMAP client/server arrangement of the prior art;

DESCRIPTION OF PREFERRED EMBODIMENTS

Figure 4:
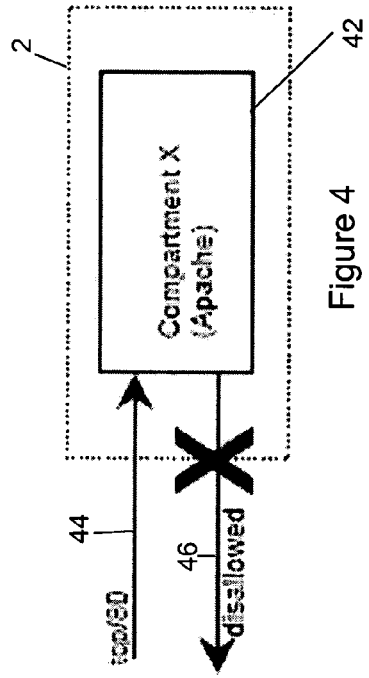
FIG. 4 is a block diagram of how communication rules may prevent connections being set up to compartments within a trusted operating system of the prior art.

Embodiments of the invention will now be described.

As a non-limiting example of the type of scenario to which embodiments of the invention might be applied, consider the provision of an IMAP mail service as shown in FIGS. 1 and 2.

FIG. 1 illustrates a conventional IMAP mail service, wherein an IMAP mail server 10 on a local host 2 is arranged to communicate via a network 12 with an IMAP mail client 14 on a remote host 4. The mail client 14 connects to the server 10 on TCP port 143 (IMAP). Where both the server 12 and the client 14 do not support encryption then plaintext information must be transmitted over the network 12, which is liable to interception.

To add encryption to such a service a program, e.g., "Stunnel" available from Michael Trojnara allowing encryption of arbitrary TCP connections inside SSL (Secure Sockets Layer) available on both Unix and Windows. Stunnel allows the securing of non-SSL aware daemons and protocols (like POP, IMAP, LDAP, etc) by having Stunnel provide the encryption, requiring no changes to the daemon's code.

One conventional way to use Stunnel is to have it listen on some chosen TCP port (for example port 993 which is allocated for IMAP+SSL) and when a client connects (using SSL to make an encrypted connection) Stunnel accepts the connection and makes a plain-text connection to some other chosen port (e.g. port 143—IMAP—to match the choice above). Stunnel then relays the traffic decrypting it on the way in and encrypting it on the way out. The effect is to set up a system as shown in FIG. 2, wherein the Stunnel component 20 listens to port 993 for SSL connections from the client 14, accepts the connection and invokes an SSL library function to decrypt the received encrypted data, and passes the plaintext decrypted data to the IMAP server over a connection to port 143. Data sent from the server 10 travels from port 143 over the connection to the Stunnel component 20, wherein it is encrypted by an SSL library function and sent as ciphertext to the client 14 over the connection from port 993. At the client side of the connection a client Stunnel component 22 can perform the corresponding encryption and decryption operations.

With such an arrangement it is possible for a malicious mail client 14 to connect directly to the mail server 10 on port 143, thereby bypassing the Stunnel encryption component 20, as shown in FIG. 3, and causing plaintext data to be transmitted over the network 12 to the client 14. Such operation may clearly be in violation of a security policy that requires data to be encrypted prior to transmission.

Moreover, where a security policy requires data to be stored in data storage media such as hard disk drives in encrypted form it is necessary to ensure that plaintext data cannot be stored directly on the drive, and that a suitable encryption routine is invoked first.

Embodiments of the invention to be described make use of elements of trusted operating systems. Examples of trusted operating systems include Trusted Solaris from Sun Microsystems®, FreeBSD, or Trusted Linux from Hewlett Packard®. Trusted operating systems implement the principle of "containment". An application is contained if it has strict controls placed on which resources (e.g., file, process, network, inter process communication (IPC)) it can access (and what type of access it has, e.g., read-only) even if the application has been compromised. Containment also protects an application from external attack and interference. Once an application has been compromised (for example by a buffer overflow attack) it can be exploited in several ways by an attacker to breach the security of a system. The containment property has the potential to mitigate many of these exploits, and in some cases the exploits are entirely eliminated. Some of the benefits of containment can only be achieved at the application design level, however if implemented correctly it can also be usefully used to effectively secure a large number of existing applications without application modification.

Kernel enforced containment mechanisms in trusted operating systems have been available for several years. The containment property is usually achieved through a combination of Mandatory Access Controls (MAC), and Privileges. MAC protection schemes enforce a particular policy of access control to the system resources such as files, processes and network connections. This policy is enforced by the kernel and cannot be overridden by a user or compromised application. More particularly, mandatory access controls are enforced consistently by the operating system—users cannot choose which information will be regulated. Typically, information has associated with it a sensitivity label. The sensitivity label comprises a 'classification' and a number of 'compartments'. The operating system labels files, processes and network connections. In general, to have read access to some data, a process must have a sensitivity label which 'dominates' the label of the data. A sensitivity label is said to dominate another when its classification is higher or equal to the other's classification, and when it includes all compartments included in the other label. For write access, a process's label must exactly equal the data's label.

Within Trusted Linux in particular, however, a slightly more simple approach is taken. Trusted Linux is a layered extension of the standard Linux OS at the kernel level (with user level support). It has the containment property that can be used in guarding against application compromise amongst other things. Similar to other trusted operating systems the property of containment is obtained within Trusted Linux by kernel level mandatory protection of processes, files and network resources. However, in Trusted Linux mandatory controls are slightly simpler to those found on other trusted operating systems, and in particular make use of the key concept of compartments.

Here, services and applications on the machine are run within separate compartments. Simple mandatory access controls and process labeling are used to realise the concept of a compartment. Each process is given a label; processes with the same label belong to the same compartment. Kernel level mandatory checks are enforced to ensure that processes from one compartment cannot interfere with processes from another compartment. The access controls are very simple, labels either match or do not match.

File system protection is also mandatory. Unlike traditional trusted operating systems, Trusted Linux does not use labels to directly control access to the file system, which would require labelling individual file system objects. Instead, each compartment has a chroot-ed section of the file system associated with it and flexible file system rules that specify read/write access using overlapping directory sub-trees (where chroot is a conventional linux command which specifies a new root directory in which a command is to be run).

Flexible communication paths between compartments and network resources are further provided via narrow, kernel level controlled interfaces to TCP/UDP plus most IPC mechanisms. Access to these communication interfaces is governed by rules specified by the security administrator on a per compartment basis. Unlike other trusted operating systems within Trusted Linux it is not necessary to override the mandatory access controls with privilege or resort to the use of user level trusted proxies to allow communication between compartments and/or network resources. These features together provide a system that both offers containment and also has enough flexibility to make application integration relatively straightforward.

Concerning kernel implementation for Trusted Linux, within the kernel each system-resource that is to be protected is extended with a tag indicating the compartment that the resource belongs to. Examples of such resources include data-structures describing:—
  individual processes,
  shared-memory segments,
  semaphores, message-queues,
  sockets, network packets, network interfaces and routing-table entries.

The assignment of the tag occurs largely through inheritance, with the init-process initially being assigned to compartment 0 (compartment 0 is typically used to host kernel-level threads (such as the swapper)). Any kernel objects created by a process inherit the current label of the running process. An example of the tag added to the kernel socket data-structure is shown below:

```
struct socket {
...
#ifdef TLINUX
unsigned long compartment;
#endif
};
```

At appropriate points in the kernel, access-control checks are performed through the use of hooks to a dynamically loadable security-module that consults a table of rules indicating which compartments are allowed to access the resources of another compartment. This occurs transparently to the running applications.

Each security check by the security module consults a table of rules. Each rule has the form:

source -> destination method m [attr] [netdev n]
where:

source/destination is one of:
  COMPARTMENT (a named compartment)
  HOST (a fixed IPv4 address)
  NETWORK (an IPv4 subnet)

m: supported kernel mechanism e.g. tcp, udp, msg (message queues), shm (shared-memory) etc.
attr: attributes further qualifying the method m
n: a named network-interface if applicable eg eth0

An example of such a rule which allows processes in the compartment named "WEB" to access shared-memory segments (e.g., using shmat/shmdt( )) from the compartment named "CGI" would look like:
COMPARTMENT:WEB→COMPARTMENT:CGI
METHOD shm Present also are certain implicit rules, which allow some communications to take place within a compartment e.g., a process is allowed to see the process identifiers of processes residing in the same compartment. This is to allow a bare-minimum of functionality within an otherwise unconfigured compartment. An exception is compartment 0, which is relatively unprivileged and where there are more restrictions applied.

In the absence of a rule explicitly allowing a cross compartment access to take place, all such attempts fail. The net effect of these rules is to enforce mandatory segmentation across individual compartments, except for those that have been explicitly allowed to access another compartment's resources. Moreover the rules are directional are in nature. One effect of the directional nature of the rules is that they match the connect/accept-behavior of TCP socket connections. Consider a rule used to specify allowable incoming HTTP connections of the form:
HOST:*→COMPARTMENT X METHOD TCP PORT 80

This rule specifies that only incoming TCP connections on port 80 are to be allowed, but not outgoing connections. This is illustrated in FIG. 4, wherein compartment X (42) provided on host 2 is allowed to receive incoming TCP connections 44 on port 80, but is prevented from making outgoing connections 46. Note, however, that the directionality of the rules permits the reverse flow of packets to occur in order to correctly establish the incoming connection, but without allowing outgoing connections to take place.

Further details concerning Trusted Linux can be found in Dalton et al. "An operating system approach to securing e-services", Communications of the ACM, vol. 44, Issue 2, p. 58 (2001), the entire contents of which are hereby incorporated herein by reference.

In view of the above discussion of the provision of containment mechanisms in trusted operating systems, embodiments of the invention will now be described which make use of such containment mechanisms to enforce red/black separation for cryptography purposes. Generally, embodiments of the invention provide for cryptographic separation between a plaintext system resource and a ciphertext system resource, both of which operate within the span of control of a single operating system. As non-limiting examples, the plaintext resource may be an application, a storage device, a network, or any other system resource which operates with plaintext data; and the ciphertext system resource again may be an application, a storage device, a network, or any other system resource but which operates with ciphertext data. For convenience and simplicity purposes, within the embodiments to be described the containment mechanisms provided by Trusted Linux and as described above will be used as the basis for description of embodiments. However, the invention should not be considered as being limited to such mechanisms, and other embodiments of the invention may use the containment mechanisms provided by other trusted operating systems, discussed generally above. Further, in connection with references to operating under a single operating system, this is intended to include within its scope operating under one of a plurality of operating systems which run on a single hardware platform, for example for the purpose of machine virtualisation techniques. In such a scenario, each 'virtualising' operating system is to be regarded a single OS. This applies even in situations where two or more OS, each of which provides machine virtualisation, run on a single hardware platform and under the overall control of an over-arching operating system which divides up hardware platform resources between the two 'subsidiary' OS providing the virtualisation. In such a scenario, for example, compartmentalisation occurs between plaintext and ciphertext resources takes place within an individual 'virutalising' OS.

Figure 5:
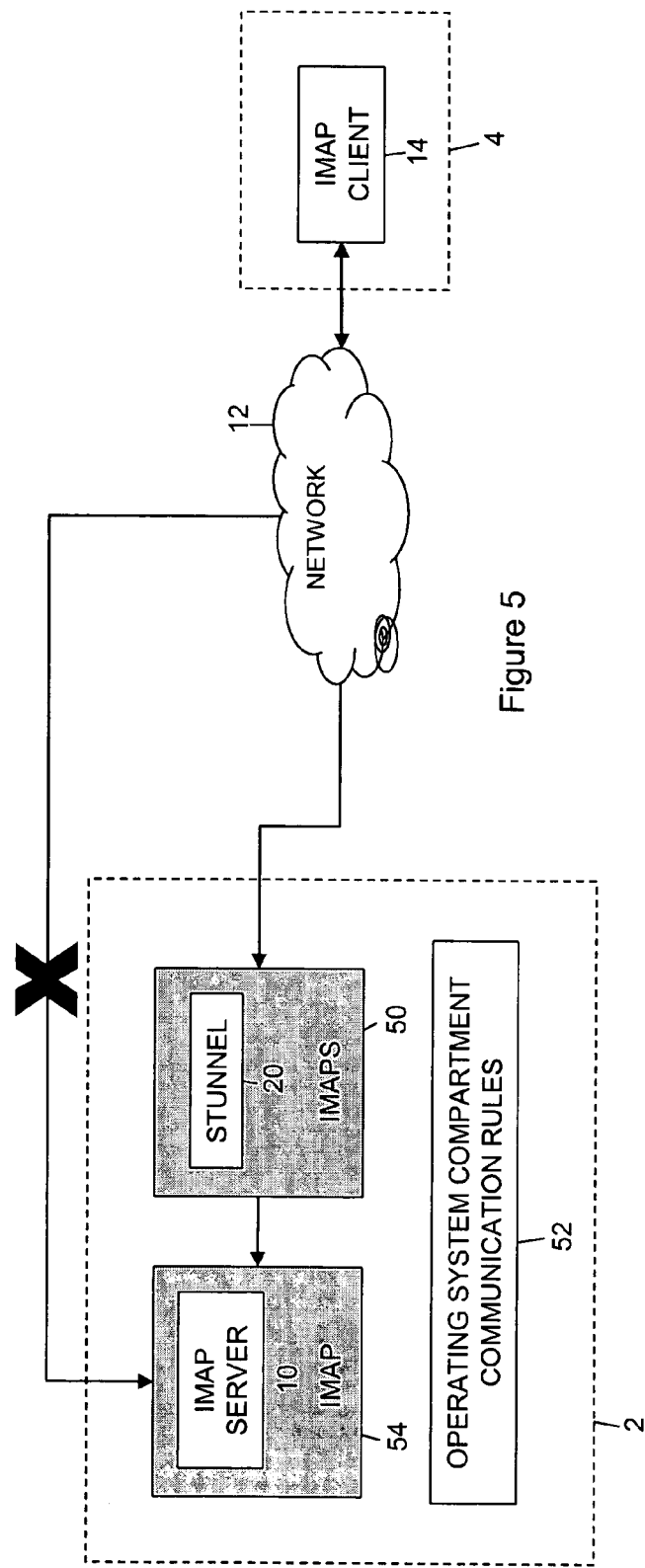
FIG. 5 is a block diagram illustrating a first embodiment of the present invention.

Referring now to FIG. 5, a first embodiment of the invention will now be described. This embodiment takes as its basis HP Trusted Linux, and the compartments and communications rules that can be provided thereby.

More particularly, a local host machine 2 running Trusted Linux is arranged to provide an IMAP service via IMAP server program 10. The IMAP server program 10 is contained within an IMAP compartment 54, and constitutes a plaintext system resource in that it operates with unencrypted data. Additionally provided is an IMAPS compartment 50 that contains the stunnel program 20, to provide encryption of data being passed to and received from the IMAP server program 10. A set of operating system compartment communication rules 52 is provided, which specifies specific rules to permit communications between the compartments 50 and 54, and between such compartments and other system elements such as network resources, storage, and the like.

A remote host machine 4 is further provided with an IMAP client program 14, which is arranged to communicate via a network 12 with the local host machine 2. The network 12 constitutes a ciphertext system resource, in that data should be encrypted prior to transmission thereover. In order to allow for IMAP messages to be passed from the IMAP server program 10 to the IMAP client program 14, it is necessary to specify appropriate communication rules 52 to permit such communications between the compartments. Moreover, in order to enforce plaintext and ciphertext separation by virtue of mandatory encryption of communications from the IMAP server program 10 by the stunnel program 20, the communications rules 52 must also specify that connections from the IMAP compartment 54 must traverse the IMAPS compartment 50, containing the stunnel program 20. In this respect, the communications rules define a mandatory path along which data must be routed from a plaintext system resource being the IMAP server, to a ciphertext system resource such as the network 12. This can be achieved by the following rules:

Host: * -> Compartment: IMAPS method TCP port 993
Compartment: IMAPS -> Compartment: IMAP method TCP port 143

The above rules allow a client on any host to connect to the IMAPS compartment on TCP port 993, and for programs running in the IMAPS compartment to connect to other programs running in the IMAP compartment. This allows the IMAP client 14 on the host 4 to connect to the stunnel program 20 running in the IMAPS compartment 50, and it further allows the stunnel program 20 running in the IMAPS compartment 50 to connect to the IMAP compartment 54 on TCP port 143. Given that according to the communications rules of Trusted Linux only those connections that are specifically permitted by communications rules are allowed, the absence of other rules means that no other communication to or from the IMAP compartment 54, or the IMAPS compartment 50 is permitted. Thus, for example, an attempt by the IMAP client 14 on the remote host 4 to connect via the network 12 directly to the IMAP compartment 54 will not be permitted by the operating system kernel on the local host machine 2.

Thus, the arrangement of FIG. 5 provides that the IMAP mail server program 10 cannot be configured or subverted to offer a plaintext service. Any data output by the IMAP server program 10 must traverse the IMAPS compartment 50, in which the stunnel encryption program 20 is running, in accordance with the mandatory data path defined by the communications rules. As a consequence, plaintext and ciphertext (or red/black) separation is maintained and enforced.

The first embodiment of the invention described above is advantageous in that it can be created using commercially available components, and illustrates separating the service operating in plaintext from the outside network where encrypted communication is required, by interposing the stunnel component whose specific task is encryption, and enforcing the separation with compartments and communication rules. However, separation within the first embodiment depends upon the underlying compartments and communication rules in the operating system, and the correctness of "stunnel" as the encrypting component.

It is a well-established principle that components that need to be correct should be as simple as possible, both in their specification and their implementation. "Stunnel", although relatively simple compared to most services with built in encryption, is still not simple enough to be the ideal component for high security systems. In particular, it has various options and control logic around the base encryption engine, which may provide opportunities for subversion.

To prevent this, ideally the function of stunnel should be broken into a number of pieces, and these pieces would run in separate compartments. This is illustrated in the second embodiment, in FIG. 6.

The local host machine 2 is again provided with the IMAP compartment 54, running the IMAP server program 10. Additionally, a set of operating system compartment communication rules 52 is further provided, to regulate the communications that may take place between compartments by defining mandatory paths between compartments along which data must be routed. To separate out the components of the encryption program, however, a "plain" compartment 62 is provided, in which a plaintext control program 68 is run, and which operates the plaintext communication and control elements of the encryption process. Additionally, a "cipher" compartment 60 is also provided, in which a ciphertext control program 72 is run, and which controls the encrypted-side communication and control functions. An "encryption" compartment 64 is also then provided, in which an encryption engine 70 is run, and which provides the core encryption or encipherment processes to be run on plaintext data passed thereto. Likewise, the encryption engine program 72 may also provide decryption or decipherment of ciphertext data to be rendered into plaintext.

The operating system compartment communication rules set 52 contains sufficient rules to enable communication between the compartments. In particular, within the diagram communication flows are shown by arrows, and a communication rule is required for each indicated communication flow. Therefore, explicit communication rules are required to allow the IMAP compartment 54 to communicate in either direction with the plain compartment 62, communication rules are also provided to allow the plain compartment 62 to communicate in either direction with the encryption compartment 64, and finally explicit communication rules are required to allow the encryption compartment 64 to communicate with the cipher compartment 60. Additionally, of course, the cipher compartment 60 should also have specific communication rules to allow it to communicate with the IMAP client program 14 running on the remote host computer 4, via the network 12. As with the previous embodiment, the set of communications rules define a mandatory path between compartments along which data must be routed. No other passing of data between compartments other than that provided for by a communications rule is permitted. For example, an explicit set of appropriate communication rules is set out below:—

```
Host: * -> Compartment: Cipher method TCP port 993
Compartment: IMAP -> Compartment: Plain method TCP port xxx
Compartment: Plain -> Compartment: Encryption method TCP port xxx
Compartment: Encryption -> Compartment: Cipher method TCP port xxx
Compartment: Cipher -> Compartment: Encryption method TCP port xxx
Compartment: Encryption -> Compartment: Plain method TCP port xxx
Compartment: Plain -> Compartment: IMAP method TCP port xxx
``` where xxx represents different appropriate TCP port numbers.

With such an arrangement, the separation between plaintext and ciphertext can be guaranteed, and the splitting of the encryption function into three compartments as shown provides for a higher degree of assuredness of the correctness of each component.

Figure 6:
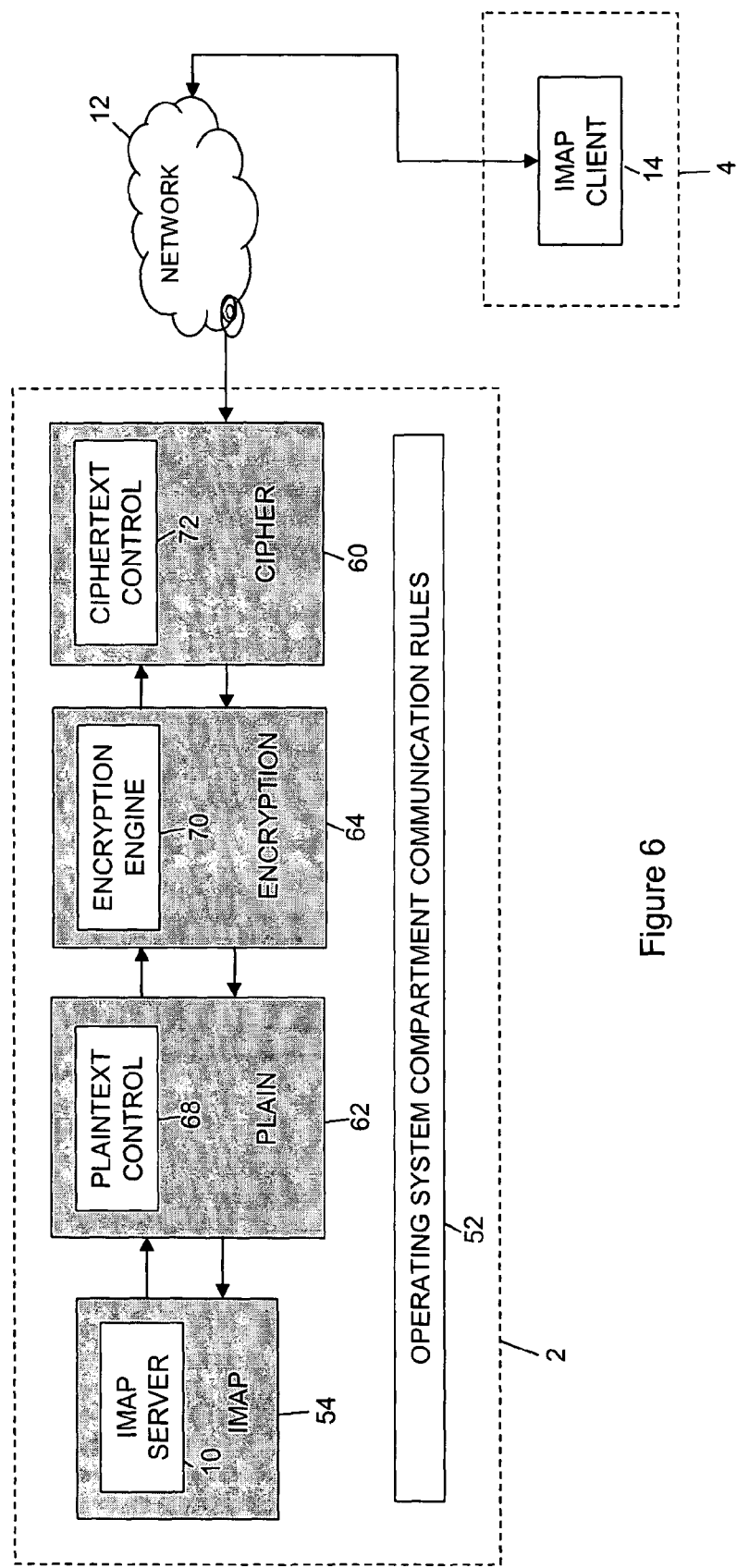
FIG. 6 is a block diagram illustrating a second embodiment of the present invention.

It should also be noted that the communications rules denoted by arrows pointing to the right in FIG. 6 are strictly not necessary to allow the IMAP client to connect to the IMAP server, as all that is required for such connection are the control rules represented by arrows pointing to the left. However, the rules represented by the arrows pointing to the right are a convenient way of implementing a control path or channel for any necessary control data which is required to be passed from the IMAP server to the plaintext control program, encryption engine, or ciphertext control program, or between the plaintext control program, encryption engine, and ciphertext control program.

Figure 7:
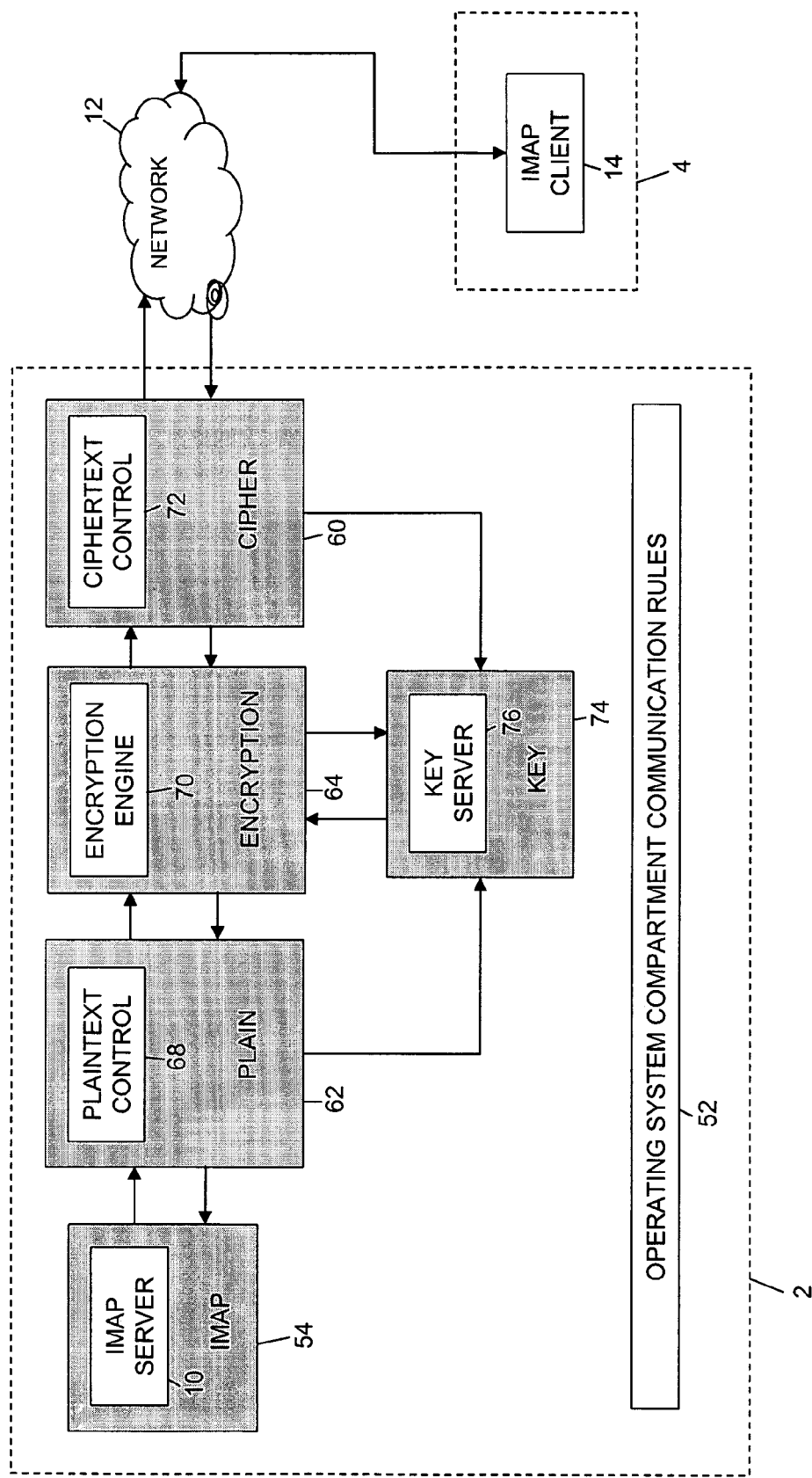
FIG. 7 is a block diagram illustrating a third embodiment of the present invention.

A third embodiment of the invention is shown in FIG. 7. This third embodiment takes as its basis the second embodiment as described previously, but which further separates key handling of keys used by the encryption engine 70 into a separate compartment. More particularly, as shown in FIG. 7, a "key" compartment 74 is further provided, in which a key server program 76 is run. The operating system compartment communication rules 52 are augmented by further communication rules, to allow communication from the plain compartment 62 and the cipher compartment 60 to key compartment 74, and to allow communications from the key compartment 74 to the encryption compartment 64. Thus, for example, both the plain text control program 68, and the cipher text control program 72 may pass control messages to the key server 76, for example to indicate to the key server 76 which key to pass to the encryption engine 70 for an encryption or decryption process. Moreover, the plain text control program 68 and the cipher text control program 72 may also communicate with the key server program 76 to allow new keys to be stored in the key compartment 74.

Such an arrangement adds an additionally layer of security.

Within the above described embodiments we have concentrated on describing an IMAP mail service, and how the use of operating system compartments can enforce plaintext and ciphertext separation in such a service. Of course, however, the present invention is not limited to the provision of such a mail service, and can in fact be used for any application that requires encryption of data, either for transmission, or storage, or for other purposes. Such a general embodiment of the invention is shown in FIG. 8.

Figure 8:
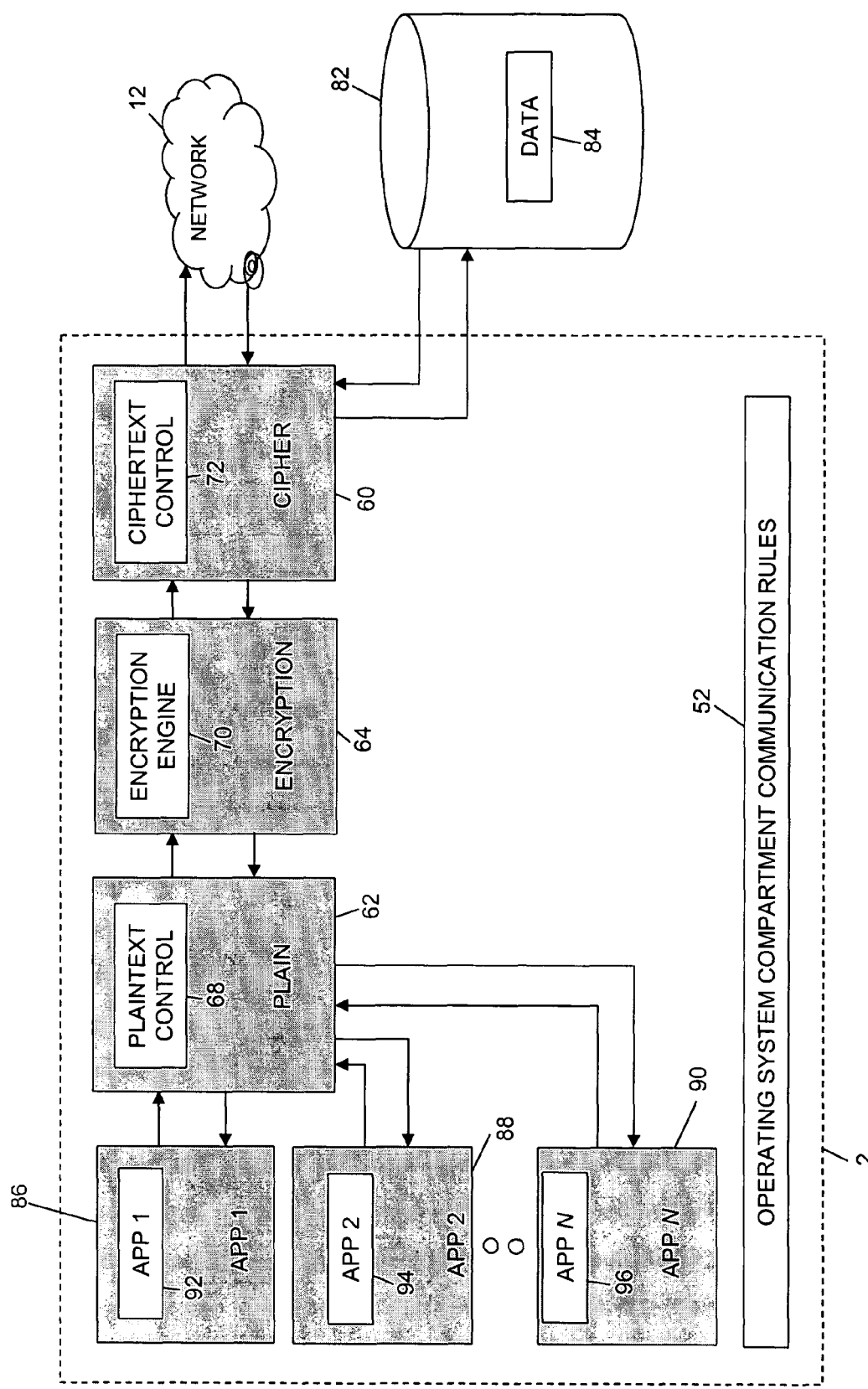
FIG. 8 is a block diagram illustrating a fourth embodiment of the present invention.

With reference to FIG. 8, here the "plain", "encryption", and "cipher" compartments 62, 64, and 60 are each provided, in a similar fashion to the second embodiment described above. Within each of these compartments is respectively provided a plaintext control program 68, an encryption engine 70, and a ciphertext control program 72, again as previously described with respect to the second embodiment. A set of operating system compartment communication rules 52 is also provided, to define explicit communication rules between compartments, and which themselves define a mandatory data path or paths along which data must be routed between compartments. The "cipher" compartment 60 is arranged to form connections via the network 12, or to a storage medium 82, such as a file server or the like. The storage medium 82 stores encrypted data 84, output from the cipher compartment 60. The network 12 or storage medium 82 are examples of a ciphertext system resource which somehow uses, transports, stores or otherwise operates on encrypted data.

Additionally provided within the local host 2 are further application specific compartments app_1 86, app_2 88, to app_n 90. As many separate application compartments as are required may be provided. In this respect, within Trusted Linux the implementation of compartments is merely a machine word label attached to processes. Within each application compartment there is provided one or more respective plaintext application programs, such as app_1 program 92, app_2 program 94, to app_n program 96. These plaintext application programs may be any conventional application programs, such as word processing applications, spreadsheet applications, database applications, imaging applications, or the like. Such plaintext application programs constitute plaintext system resources, in that they use, store, transport or otherwise operate on unencrypted data. In order to enforce encryption of the data produced by the plaintext application programs, however, the operating system compartment communication rules 52 contain explicit communication rules which ensure that it is not possible for the plaintext applications running within the plaintext application compartments 86, 88, or 90 to transmit or store their data via the network 12, or in the storage medium 82, without that data first being encrypted. This is provided by communication rules that specify that the only output from the plaintext compartments must be output on a mandatory data path to the "plain" compartment 62, running the plaintext control program 68. From the "plain" compartment 62, data may only be passed onwards over the mandatory data paths defined by the communications rules via the "encryption" compartment 64, and the "cipher" compartment 60, in a manner described previously with respect to the second embodiment. A set of suitable operating system compartment communication rules which provide such functionality is shown below:—

```
Network: * -> Compartment: Cipher method TCP port xxx
Compartment: Cipher -> Network: * method TCP port xxx
Host: * -> Compartment: Cipher method TCP port xxx
Compartment: Cipher -> Host: * method TCP port xxx
Compartment: App__1 -> Compartment: Plain method TCP port xxx
Compartment: App__2 -> Compartment: Plain method TCP port xxx
Compartment: App__N -> Compartment: Plain method TCP port xxx
Compartment: Plain -> Compartment: Encryption method TCP port
   xxx
Compartment: Encryption -> Compartment: Cipher method TCP port
   xxx
Compartment: Cipher -> Compartment: Encryption method TCP port
   xxx
Compartment: Encryption -> Compartment: Plain method TCP port
   xxx
Compartment: Plain -> Compartment: App__1 method TCP port xxx
Compartment: Plain -> Compartment: App__2 method TCP port xxx
Compartment: Plain -> Compartment: App__N method TCP port xxx
``` where xxx is a suitable TCP port. It should be noted that other communications methods other than TCP may also be used, where appropriate, and also that the specific set of rules and ports depend upon the particular applications which are being supported.

With such an arrangement, the present invention can be used to enforce plaintext and ciphertext separation for any application, regardless of the subsequent use of its data. Where a security policy mandates that the output of a plaintext application must be encrypted prior to, for example, transmission, or storage, then the arrangement of this embodiment can guarantee that such a policy is adhered to.

Figure 9:
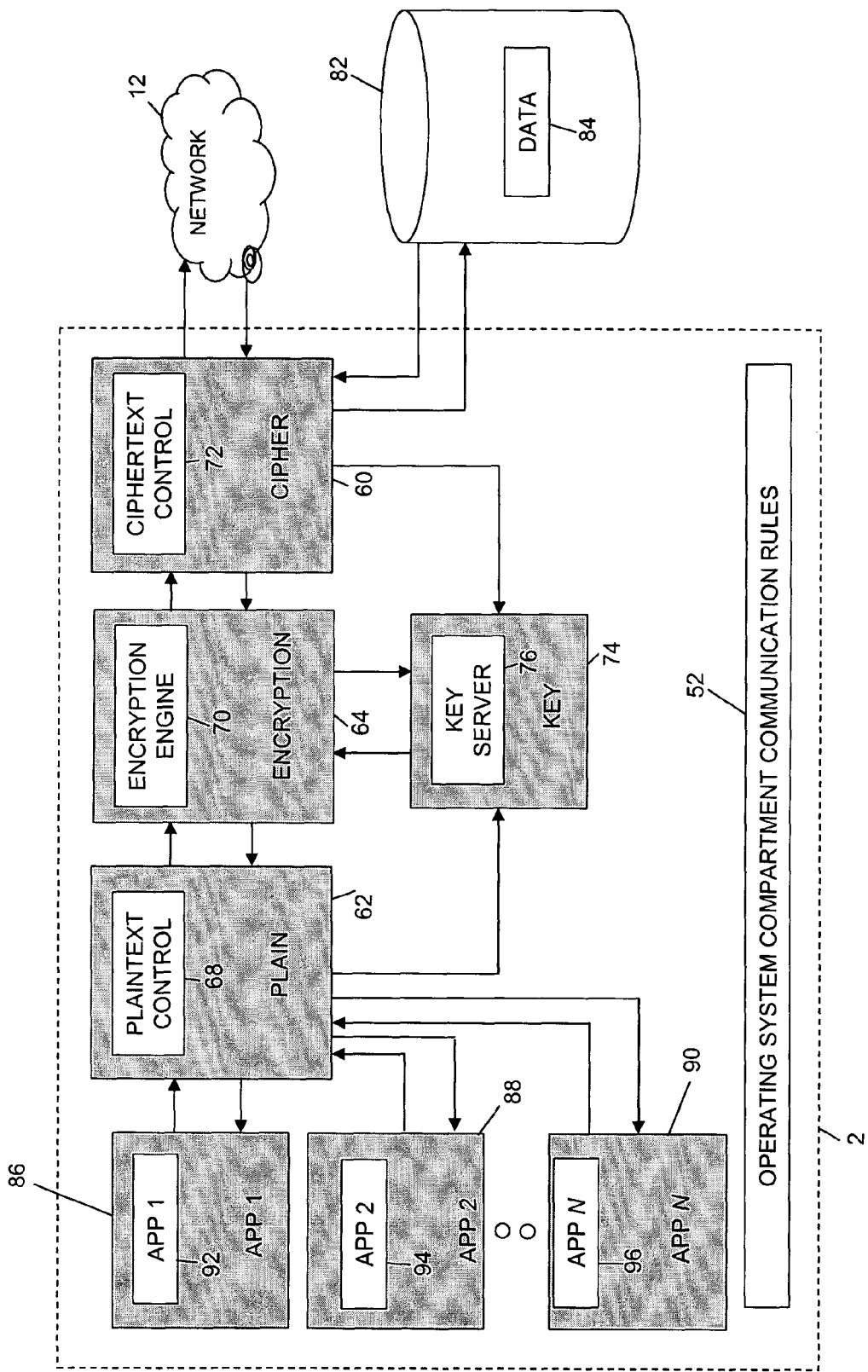
FIG. 9 is a block diagram illustrating a fifth embodiment of the present invention.

FIG. 9 illustrates a further embodiment of the invention that builds upon the fourth embodiment as described previously with respect to FIG. 8. Here, a key server program 76, provided within a "key" compartment 74, performs the encryption key functions of the encryption engine 70. In this respect, the arrangement of the "key" compartment 74, and the key server program 76 are substantially the same as described previously with respect to the third embodiment of FIG. 7. Such an arrangement provides for additional security for the more general application of the invention to any plaintext application program that requires encryption of its input or output.

Figure 10:
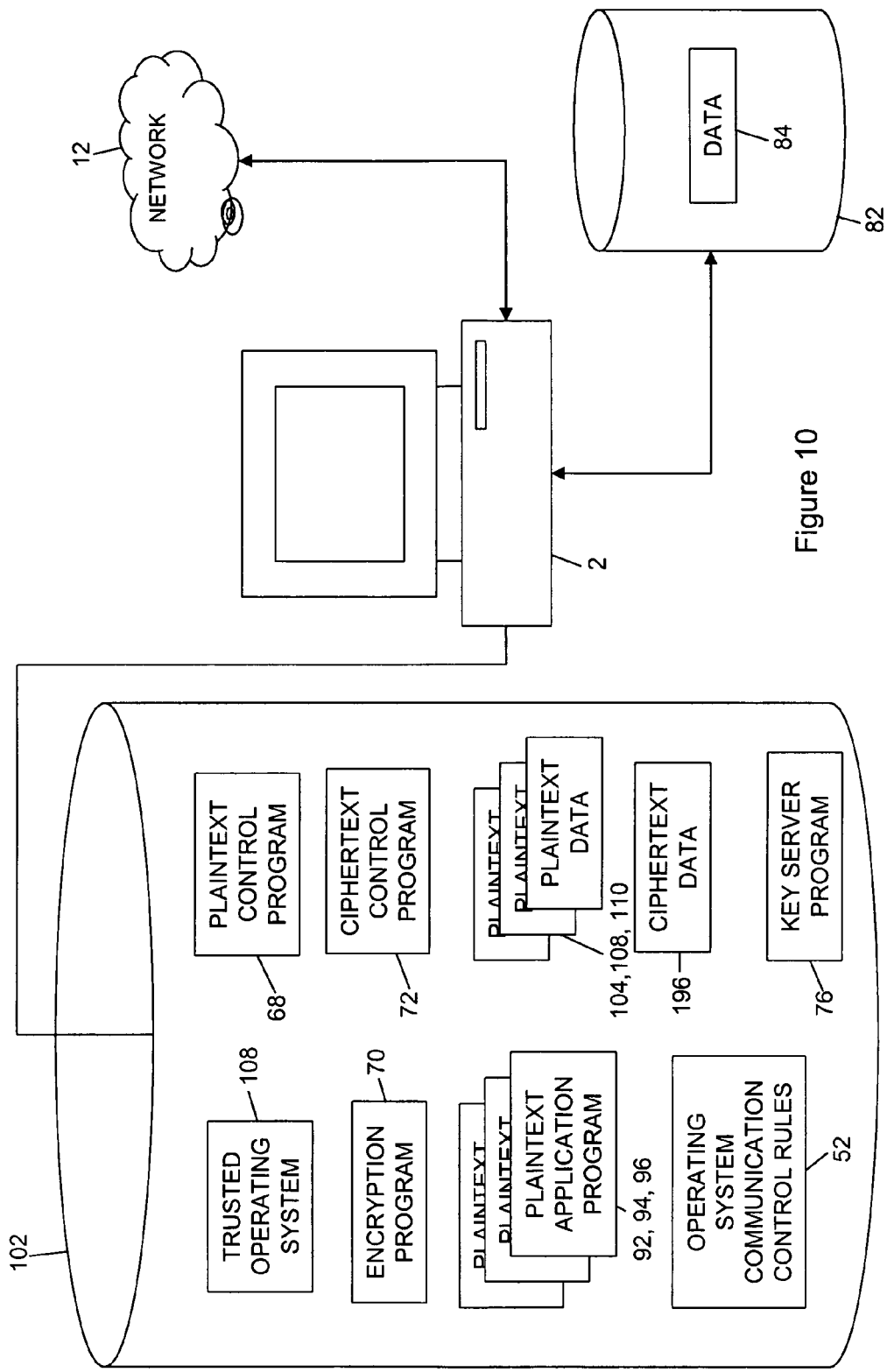
FIG. 10 is a diagram of a computer system provided with a computer readable storage medium which may be used to implement embodiments of the present invention.

The above-described embodiments may be implemented upon any conventional computer system that is capable of running a trusted operating system, such as Trusted Linux. FIG. 10 illustrates such a conventional computer system 2, which is provided with a computer usable storage medium 102, such as a hard disk drive or the like. Stored on the hard disk drive 102 is a trusted operating system 108, such as HP Trusted Linux described previously. Additionally stored on the storage medium 102 are the other program elements mentioned previously for each embodiment. Thus, for the embodiment of FIG. 9, then as shown an encryption engine program 70 is further provided, as well as a plaintext control program 68, a ciphertext control program 72, and a key server program 76. The set of operating system compartment communication rules 52 is also stored in the storage medium.

Additionally, the various plaintext applications programs 92, 94, and 96 are also provided, as well as respective sets of plaintext data 104, 108, or 110, respectively utilised or provided by each plain text application program. Ciphertext data 196 being encrypted or enciphered data provided by the encryption engine 70 to the ciphertext control program 72 may also be stored on the computer usable storage medium 102, prior to transmission via the network 12, or storage on a remote storage device 82, provided on a remote file server or the like.

It is of course possible to make modifications to the above-described embodiments to provide further embodiments. For example, as mentioned, although we have based the embodiments upon Trusted Linux, it is possible to use other trusted operating systems as the operating system for the embodiment. The prime requirement in this respect is that the trusted operating system used provides for containment facilities analogous to the compartments of Trusted Linux described.

Moreover, whilst within the embodiments described above we have described a single encryption engine program 70 running in a single encryption compartment 64, other embodiments of the invention may use multiple encryption engines in separate encryption compartments, or the same encryption compartment. Such multiple encryption engines would preferably be arranged in a chain configuration to apply its respective encryption processes to the output of the encryption engine preceding it in the chain. With such an arrangement communications protocols that use a fixed number of layers of encryption can be accommodated.

In addition, it should be noted that the embodiments of the invention are independent of the precise cryptographic processes used by the encryption engine 70, in that any cryptographic encryption or decryption technique may be used by the encryption engine, including symmetric and asymmetric techniques. Thus, for example, the encryption engine 70 may apply stream ciphers such as RC4, or block ciphers such as DES, Triple-DES, RC2, Idea, Fortezza, or the like. Alternatively, asymmetric algorithms such as the RSA algorithm may be used. Whichever cryptographic process is used by the encryption engine 70, the plaintext and ciphertext control programs, as well as the key server program, are arranged to support the chosen encryption process, by providing suitable control and key management functions. For example, the ciphertext control program can be arranged to perform key exchange functions to obtain encryption keys for use by the encryption engine 70.

Additionally, whilst in the embodiments described above we have shown the plaintext control program, encryption engine program, and ciphertext control program being shared between different multiple applications, in other embodiments of the invention respective control programs and encryption engines may be provided for each application which is being supported. In such a case each control program and encryption engine is preferably contained within its own separate compartment, and communications rules provided in the manner described above to permit communications between a supported application and its respective encryption control programs and encryption engine.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A system for data encryption comprising:
a computer containing one or more programs implementing:
an encryption engine;
a plaintext data system resource and a ciphertext data system resource both of which run on a single operating system; and
operating system elements that ensure that data passing between said plaintext data system resource and said ciphertext data system resource is processed by the encryption engine so as to be encrypted or decrypted, as appropriate and that ensure transfer of data via other data paths between said plaintext data system resource and said ciphertext data system resource that avoid the encryption engine be prevented, wherein the operating system elements comprise a set of the communications rules that define a mandatory path along which data must be routed between the plaintext system resource and the ciphertext system resource.

2. The system of claim 1, wherein said operating system elements comprise control elements arranged to provide mandatory system resource access controls.

3. The system of claim 2, wherein said control elements comprise (a) operating system compartments, and (b) communications rules specifying permissible communications between said compartments.

4. The system of claim 3, wherein said operating system compartments comprise data labels assigned to the system resources, the communications rules utilizing said data labels, communications between the system resources being permitted in dependence on the communications rules.

5. The system of claim 3, wherein only communications specified by a communications rule are permitted.

6. The system of claim 1, wherein the encryption engine further comprises a plaintext encryption control element, an encryption element, and a ciphertext encryption control element.

7. The system of claim 3, wherein the encryption engine further comprises a plaintext encryption control element, an encryption element, and a ciphertext encryption control element, each contained within respective compartments.

8. The system of claim 1, wherein the encryption engine further includes a key server.

9. The system of claim 3 wherein the encryption engine further includes a key server contained within a respective compartment.

10. A method of operating a computer having an operating system, and plaintext and ciphertext system resources running on the operating system, the method comprising the steps of:
   transmitting data between the plaintext and ciphertext system resources within the computer;
   routing the transmitted data via an encryption engine between the plaintext and ciphertext system resources in the computer system;
   using operating system elements to ensure that the encryption engine encrypts or decrypts, as the case requires, the data transmitted between the plaintext and ciphertext system resources; and
   using the operating system elements to ensure that transfer of data via other data paths between the plaintext and ciphertext system resources that avoid the encryption engine be prevented, wherein using the operating system elements comprises implementing in the operating system, a set of the communications rules that define a mandatory path along which data must be routed between the plain text system resource and the ciphertext system resource.

11. The method of claim 10, wherein the mandatory path comprises a plurality of operating system compartments, and the communications rules specify permissible communications between said compartments so as to define the mandatory path.

12. The method of claim 11, wherein data labels are assigned to the system resources, the communications rules utilizing said data labels, communications between the system resources being permitted in dependence on the communications rules.

13. The method of claim 11, wherein only communications specified by a communications rule are permitted.

14. A non-transient computer usable storage medium storing a computer program that when executed by a computer performs the method of claim 10.

15. The method of claim 10, wherein the operating system includes compartments and only permits connections to compartments that are specifically permitted by communications rules, and no communication rule in the operating system, other than the communications rules that define the mandatory path, permit connections to or from a compartment containing the plaintext system resource.

16. The system of claim 1, wherein the operating system includes compartments and only permits connections to compartments that are specifically permitted by communications rules, and no communication rule in the operating system, other than the communications rules that define the mandatory path, permit connections to or from a compartment containing the plaintext system resource.

17. The system of claim 1, wherein the plaintext system resource comprises an IMAP server.

* * * * *